United States Patent
Dean et al.

(10) Patent No.: US 6,370,878 B1
(45) Date of Patent: Apr. 16, 2002

(54) RECOVERING HEAT FROM FUEL CELL EXHAUST

(75) Inventors: Robert E. Dean, Rexford; Norm Peschke, Clifton Park, both of NY (US); Anton Scholten, Apeldoorn (NL); Kenneth M. Rush, Jr.; Mihail Penev, both of Clifton Park, NY (US); Thomas D. Prevish, Ballston Lake, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/727,921

(22) Filed: Nov. 30, 2000

(51) Int. Cl.[7] ............................................... F01K 25/06
(52) U.S. Cl. .............................. 60/649; 60/651; 60/671
(58) Field of Search .......................... 60/649, 651, 671; 429/13, 17, 19, 24, 26

(56) References Cited

U.S. PATENT DOCUMENTS

| | | | |
|---|---|---|---|
| 4,622,275 A | 11/1986 | Noguchi et al. | 429/19 |
| 4,743,516 A | 5/1988 | Noguchi et al. | 429/16 |
| 4,759,997 A | 7/1988 | Ohyauchi et al. | 429/19 |
| 4,902,586 A | 2/1990 | Wertheim | 429/24 |
| 5,094,926 A | 3/1992 | Kobayashi et al. | 429/20 |
| 5,198,312 A | 3/1993 | Irino et al. | 429/26 |
| 5,232,793 A | 8/1993 | Miyauchi et al. | 429/16 |
| 5,316,870 A * | 5/1994 | Ohga | 429/24 |
| 5,344,721 A * | 9/1994 | Sonai et al. | 429/20 |
| 5,401,589 A * | 3/1995 | Palmer et al. | 429/13 |
| 5,482,791 A | 1/1996 | Shingai et al. | 429/23 |
| 5,503,944 A * | 4/1996 | Meyer et al. | 429/13 |
| 5,811,201 A | 9/1998 | Skowronski | 429/17 |
| 5,989,739 A | 11/1999 | Zur Megede et al. | 429/13 |
| 6,007,931 A | 12/1999 | Fuller et al. | 429/13 |
| 6,013,385 A | 1/2000 | DuBose | 429/17 |
| 6,077,620 A | 6/2000 | Pettit | 429/26 |

\* cited by examiner

*Primary Examiner*—Hoang Nguyen
(74) *Attorney, Agent, or Firm*—Fish & Richardson, P.C.

(57) ABSTRACT

A fuel cell system includes a fuel cell stack, which during operation generates electrical energy by reacting a first stream of reactant gas and a second stream of reactant gas. The fuel cell stack also produces a fuel cell exhaust stream. An oxidizer unit is positioned to receive the fuel cell exhaust stream and oxidize at least a part of the fuel cell exhaust stream during operation, to produce an oxidizer exhaust stream. A heat recovery system is positioned to receive the oxidizer exhaust stream. The heat recovery system transfers at least some heat from the oxidizer exhaust stream to an input stream to generate a heated stream of water. In some embodiments, a temperature sensor is positioned to sense the temperature of the heated input stream. A control system maintains the heated stream of water at a target temperature based on the sensed temperature by controlling the amount of the heat from the oxidizer exhaust stream that is transferred to the input stream.

32 Claims, 5 Drawing Sheets

RECOVERING HEAT FROM FUEL CELL EXHAUST

TECHNICAL FIELD

This invention relates to recovering heat from fuel cell exhaust.

BACKGROUND

Fuel cells generate electrical energy by reacting two fuel gas streams with each other. One of the gases is referred to as an anode gas while the other is referred as a cathode gas. For example, certain fuel cells use a stream of gas that is rich in hydrogen as the anode gas and an air stream as the cathode gas. When the fuel cell is in use, the hydrogen in the anode gas reacts with oxygen in the cathode gas to generate the electrical energy. The reaction produces exhaust gases, which may include un-reacted fuel gases, impurities contained within the fuel gas streams, and chemical products of the reactions in the fuel cell. The reaction in the fuel cell also generates heat, thereby elevating the temperature of the exhaust gases.

Fuel cells are normally part of a system, known as a fuel cell system that typically includes a fuel processor (also referred to as a "reformer") for generating one of the fuel gases. For example, the fuel cell system of the example above includes a reformer that reacts a hydrocarbon, such as methane, with water to produce the hydrogen rich stream. Certain fuel cell systems also include an anode tail gas oxidizer unit (ATO) where the exhaust gases from the fuel cell are, for example, reacted with oxygen to eliminate environmentally unfriendly chemicals from the exhaust. The anode tail gas oxidizer unit generates more heat, further elevating the temperature of the exhaust gases.

SUMMARY

In general, one aspect of the invention relates to a fuel cell system that includes a fuel cell stack, which during operation generates electrical energy by reacting two streams of reactant gases. The fuel cell stack also produces a fuel cell exhaust stream. An oxidizer unit is positioned to receive the fuel cell exhaust stream and oxidize at least a part of the fuel cell exhaust stream during operation, to produce an oxidizer exhaust stream. A heat recovery system receives the oxidizer exhaust stream and transfers at least some heat from the oxidizer exhaust stream to a stream of water to generate a heated stream of water. The water is used to humidify a fuel inlet stream for a fuel processor. In some embodiments, a temperature sensor is positioned to sense the temperature of the heated stream of water and a control system maintains the heated stream of water at a target temperature based on the sensed temperature by controlling the amount of the heat from the oxidizer exhaust stream that is transferred to the stream of water.

Embodiments of the invention may include one or more of the following features. In one type of embodiment of the fuel cell system, a cooling system is used to maintain the heated stream of water at the target temperature. During operation, the heat recovery system transfers some of the heat from the oxidizer exhaust stream to the cooling system thereby reducing the amount of heat that is transferred to the water stream. The control system controls the amount of heat that is transferred to cooling system based on the temperature of the heated stream of water to maintain the temperature of the heated water stream at the target temperature. The cooling system includes a coolant that, during operation, is made to flow through the heat recovery system to extract heat from the heat recovery system. The coolant also flows through a cooler and the cooler extracts the heat from the coolant. A pump drives the coolant through the heat recovery system and the coolant, thereby causing the coolant to extract the heat from the oxidizer exhaust stream based on the temperature of the heated stream of water. The control system further includes a controller that is programmed to generate a control signal based on the temperature of the heated stream of water. The pump drives the coolant based on the control signal to maintain the heated input at the target temperature.

In certain embodiments, the heat recovery system includes a first heat recovery device that transfers heat from the oxidizer exhaust stream to the stream of water to produce an hot water stream at a temperature above the target temperature and a second heat recovery device that transfers heat from the hot stream of water to the coolant to produce the heated stream of water at the target temperature.

In other embodiments, the heat recovery system includes a cavity positioned to receive the oxidizer exhaust stream, a heat exchange tube positioned in the cavity to extract heat from the oxidizer exhaust stream, an inner conductive tube positioned within the heat exchange tube to receive a first fluid, and at least one vane connecting the inner conductive tube to the heat exchange tube to concentrically position the inner conductive tube within the heat exchange tube. The vane conducts heat from the exchange tube to the inner conductive tube and the first fluid. The inner conductive tube and the exchange tube define an annular channel for receiving a second fluid and the heat exchange tube conducts heat from the oxidizer exhaust stream to the second fluid. One of the first fluid and the second fluid is the stream of water, while the other is the coolant.

In another type of embodiment of the fuel cell system, the temperature of the heated stream of water is maintained at the target temperature by controlling the amount of heated exhaust that is directed to the heat recovery system. A conduit receives the oxidizer exhaust stream from the oxidizer unit. The conduit has a branch that is connected to the heat recovery system and the control system includes a valve that is positioned within the conduit to control an amount of the oxidizer exhaust stream that is directed to the heat recovery system through the branch in response to the temperature of the heated input. Thus, the fuel cell system controls the amount of heat transferred to the stream of water.

In certain embodiments, the temperature sensor may be a thermocouple that generates a sensor signal corresponding to the temperature of the heated input. The control system includes a microprocessor that is programmed to generate a control signal based on the sensor signal and a motor, which deflects the valve in response to the control signal, thereby controlling the valve to determine the amount of heated exhaust that is directed to the heat recovery device.

In other embodiments, the size or shape of the temperature sensor varies with the temperature of the heated input, and the control system includes a linkage connecting the temperature sensor to the valve. The temperature sensor includes an element, such as a bimetal strip or a wax plug, whose size or shape varies as the temperature of the heated input changes. The linkage causes the valve to deflect as the size or shape of the temperature sensor varies, thereby causing the valve to control the amount of heated exhaust that is directed to the heat recovery device. The linkage and the temperature sensor are designed to control the amount of heated exhaust that is directed to the heat recovery device to maintain the heated input at the target temperature.

In a second general aspect of the invention, a method includes generating electrical energy by reacting a first stream of reactant gas (e.g., hydrogen or reformate) and a second stream of reactant gas (e.g., oxygen or air) in a fuel cell to produce a fuel cell exhaust stream (e.g., containing combustible gas such as anode exhaust), oxidizing at least a part of the fuel cell exhaust stream to produce an oxidizer exhaust stream, transferring at least some heat from the oxidizer exhaust stream to a stream of water to generate a heated stream of water, sensing the temperature of the heated stream of water, and maintaining the heated stream of water at a target temperature by controlling the amount of the heat from the oxidizer exhaust stream that is transferred to the stream of water based on the temperature of the heated stream of water.

Embodiments of the invention may also include one or more of the following features. Some of the heat from the oxidizer exhaust stream is transferred to a cooling system, thereby reducing the amount of heat that is transferred to the stream of water. By controlling the amount of heat from the oxidizer exhaust stream that is transferred to the cooling system based on the temperature of the heated stream of water, the temperature of the heated stream of water is maintained at the target temperature. The step of transferring the some of the heat from the oxidizer exhaust to a cooling system includes extracting heat from the heat recovery device using a coolant, and driving the coolant out of the heat recovery system, thereby causing the coolant to extract heat from the oxidizer exhaust stream. A control signal is generated based on the temperature of the heated stream of water and the coolant is driven out of the heat recovery system at a rate that is based on the generated control signal, thereby causing the coolant to extract heat from the oxidizer exhaust stream based on the temperature of the heated stream of water.

In certain embodiments heat is transferred from the oxidizer exhaust stream to the stream of water to produce an hot stream of water at a temperature above the target temperature and then some heat is transferred from the hot stream of water to the coolant to produce the heated stream of water at the target temperature.

In other embodiments, an amount of the oxidizer exhaust stream that is required to heat the stream of water to the target temperature is determined. The stream of water is heated with only the determined amount of oxidizer exhaust, thereby controlling the amount of heat transferred to the stream of water to maintain the temperature of the output stream at the target temperature. A sensor signal corresponding to the sensed temperature of the heated input is generated and a control signal is computed based on the generated sensor signal. The control signal is used to control a device that directs only the determined amount of oxidizer exhaust to a heat recovery system for heating the stream of water, thereby maintaining the heated input at the target temperature.

In another embodiment of the invention, a fuel cell system includes a fuel cell stack which during operation generates electrical energy by reacting a first stream of reactant gas and a second stream of reactant gas. The fuel cell stack also produces a fuel cell exhaust stream. The system includes an oxidizer unit that receives the fuel cell exhaust stream and oxidizes at least a part of the fuel cell exhaust stream during operation. A heat recovery system receives at least a part of an exhaust stream from the oxidizer and allows heat to transfer from the oxidizer exhaust stream to a water stream. The water stream is then sent to a fuel processor humidifier system and mixed with a hydrocarbon gas stream to form a humidified fuel processor fuel inlet stream. Since the vapor pressure of water varies with temperature, the temperature of this mixture may be controlled to maintain a desired steam to carbon ratio in the humidified fuel processor fuel inlet stream. In some embodiments, the oxidizer may have a housing that forms a structural portion of a humidifier system such that heat transfer is provided between the oxidizer unit and the humidifier system. As an example, the humidifier system may enclose at least a portion of the oxidizer unit, be adapted to receive a heated water stream and drip the heated water across an evaporation surface, and be further adapted to flow a hydrocarbon gas across the evaporation surface to form a humidified fuel processor fuel inlet stream. The evaporation surface can be, for example, ceramic, metal or plastic "barrels" or other shapes that provide surface area for the water to flow across. In some embodiments, the humidifier system can also include a coolant line that circulates a coolant to transfer heat between the coolant and the humidifier system, thus providing greater capacity and flexibility for thermal control of the system.

In yet another aspect of the invention, a method is provided wherein a fuel processor gaseous fuel stream is flowed across a heated water stream, and a temperature of the heated water stream is controlled to regulate an amount of water vapor that is passed into the fuel processor gaseous fuel stream. In some such embodiments, the heated water stream is dripped onto an evaporation surface, and the fuel processor gaseous fuel stream is flowed over the evaporation surface. Other embodiments may include regulating an amount of air fed to the oxidizer unit to maintain a desired temperature of a catalyst within the oxidizer unit, transferring heat from an exhaust of the oxidizer unit to a water stream to form the heated water stream, and transferring heat from the heated water stream to a coolant stream to maintain a desired temperature or the heated water stream. Other embodimetns are possible.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
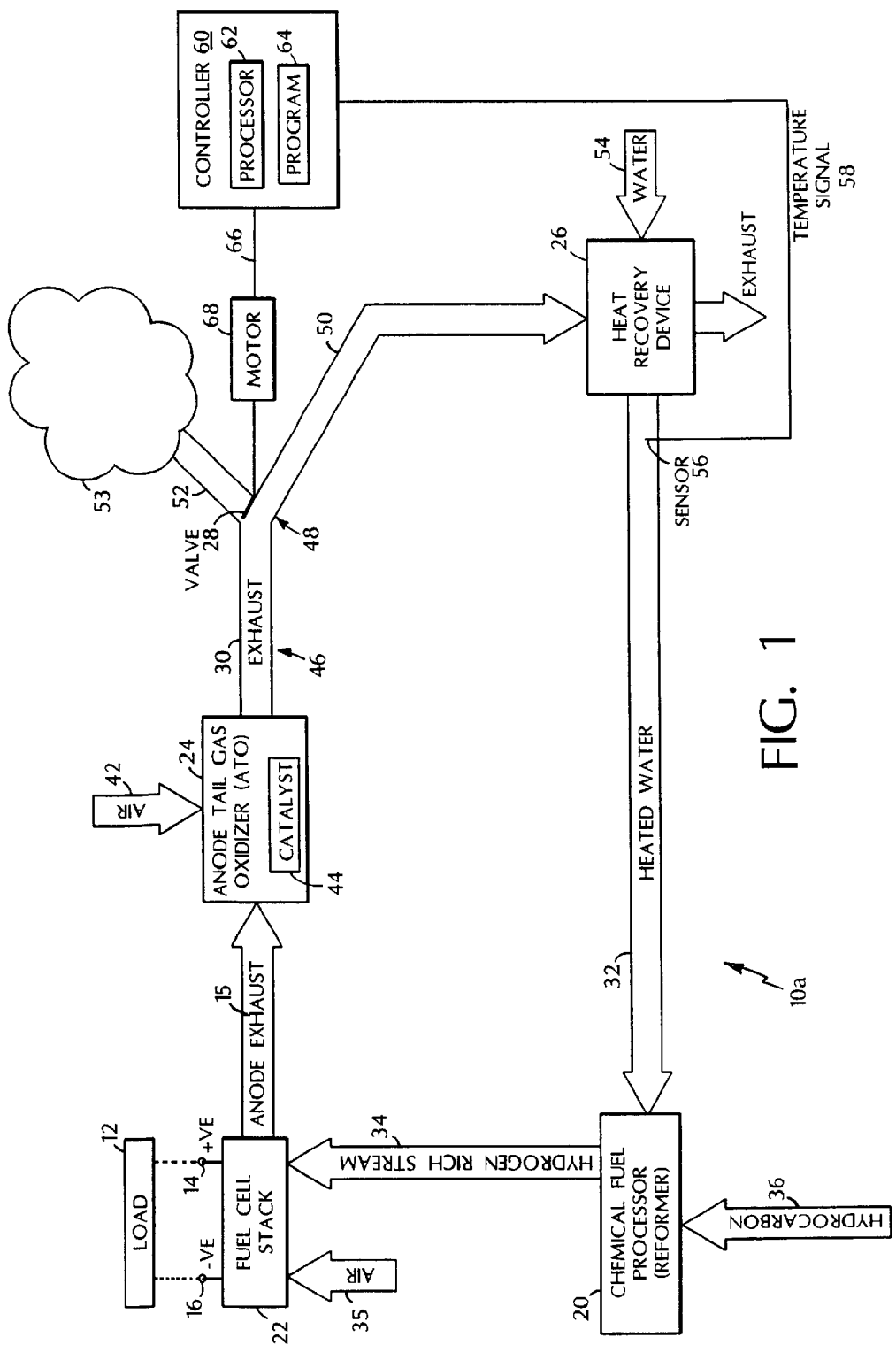
FIG. 1 is a block diagram of a fuel cell system.

As shown in FIG. 1, a first embodiment of a fuel cell system 10a for supplying power to a load 12 has a positive electrical terminal 14 and a negative electrical terminal 16 for connecting to corresponding terminals of the load. Load 12 typically includes a power conditioning system and a circuit to which electrical appliances and/or equipment are connected. When fuel cell system 10a is in use, it delivers electrical energy to load 12 by generating a potential difference between terminals 14, 16. Fuel cell system 10a includes a fuel cell stack 22 that generates the electrical energy using a hydrogen-rich gas stream 34 produced by a reformer 20. Fuel cell stack 22 also produces anode exhaust 15. An anode tail gas oxidizer unit 24 oxidizes the anode exhaust 15, producing a heated oxidizer exhaust 30. A valve 28 directs the heated oxidizer exhaust 30 to a heat recovery device 26. Heat recovery device 26 recovers heat from oxidizer exhaust 30 and transfers the heat to water 54 to produce heated water 32, which is used by reformer 20 to generate the hydrogen rich stream 34 (e.g., by reacting the hydrocarbon 36 with oxygen and/or steam as known in the art).

The reformer 20 may include a humidifier vessel (not shown) where the hydrocarbon stream 36 is mixed with a desired amount of steam (e.g., from heated water stream 32) to achieve a desired steam to carbon ratio before the mixture is reacted. In the context of this invention, the term "input stream" may be used to refer to water stream 54, and the term "heated input stream" may be used to refer to heated water stream 32, or to fuel stream 36 that has been humidified by heated water stream 32 and is then reacted in the reformer 20. For example, a set point associated with temperature sensor 56 may be based on the temperature of either stream. In the embodiment shown in FIG. 1, a sensor 56 senses the temperature of the heated water 28 and a valve 28 responds to the sensed temperature by controlling the amount of oxidizer exhaust 30 that is directed to the heat recovery device, thereby controlling the temperature to which water 32 is heated. Since the vapor pressure of water from the heated water stream 32 varies with temperature, it is possible to control the steam to carbon ratio fed to the reformer 20 by controlling the temperature of the reformer feed from the humidifier, in this case by controlling the temperature of the water 32 that is used to humidify hydrocarbon feed 36. For example, a temperature range from 70–85° C. may be desired to maintain a steam to carbon ration of from about 2:1 to 6:1.

Fuel cell stack 22 is, for example, a stack of proton exchange membrane fuel cells, each of which reacts some of hydrogen-rich stream 32 (anode gas) with a stream of air 35 (cathode gas) to generate the electrical energy. The reaction in the fuel cell stack 22 also produces an anode exhaust 15, which typically includes residual amounts of un-reacted hydrogen gas from the hydrogen-rich stream 32. For example, the anode exhaust 15 may contain around ten percent un-reacted hydrogen gas. Anode exhaust 15 may also include residual amounts of un-reacted hydrocarbons 36.

Anode tail gas oxidizer unit 24 exposes the anode exhaust 15 from the fuel cell to air 42 in the presence of a catalyst 44, such as platinum or palladium, that promotes oxidation. The catalyst 44 causes the anode exhaust 15, including the residual hydrocarbons and residual hydrogen, to oxidize at relatively low temperatures. For example, the catalyst 44 typically promotes oxidation at a temperature between 500° C. and 800° C. The oxidation process also generates heat, thereby raising the temperature of the oxidizer exhaust 30.

Oxidizer exhaust 30 flows into a conduit 46 that splits into two branches 50 and 52 at a branch point 48. A first branch 50 delivers some of exhaust 30 to heat recovery device 26, and a second branch 52 delivers the rest of the exhaust 30 to the atmosphere 53 (as an example). A valve 28 positioned at branch point 48 controls how much of the ATO exhaust 30 is directed into the first branch 50. For example, if the valve 28 is deflected away from the first branch 50, it directs more of ATO exhaust 30 down first branch 50 to heat recovery device 26. But if the valve 28 is deflected towards the first branch 50, it directs more of the ATO exhaust gas 30 down second branch 52 and into the atmosphere, thereby reducing the amount of ATO exhaust gas 30 that flows to the heat recovery device 26. Thus, valve 28 controls the amount of oxidation exhaust 30 that is directed to heat recovery device 26.

Heat recovery device 26 can be, for example, a multi-pass fin-and-tube heat exchanger that transfers heat from the anode tail gas exhaust 30 to a water stream 54 to produce a stream of heated water 32 for reformer 20. Thus, heat recovery device 26 increases the efficiency of the fuel cell system 10a by using oxidation exhaust 30 to heat water that is used in the reformer 20. By controlling the amount of oxidation exhaust 30 that is directed to the heat recovery device 26, the valve 28 controls the amount of heat that is transferred to water 54, thereby controlling the temperature of the stream of heated water 32.

Sensor 56 is positioned in the stream of heated water 32 to measure the temperature of the heated water 32. Sensor 56 is a thermocouple that senses the temperature of heated water 32 and generates a corresponding temperature signal 58. A controller 60, which includes a processor 62, monitors the temperature signal 58. Processor 62 is programmed with program 64, which causes the processor to generate a control signal 66 that operates a motor 68, which is mechanically coupled to valve 28. Motor 68 responds to the control signal 66 by deflecting the valve 28 in the appropriate manner, thereby causing the valve to control the amount of oxidation exhaust 30 that is directed to the heat recovery device. The program 64 causes the processor to generate a control signal that results in the valve 28 deflecting to maintain the temperature of the heated water 32 at the target temperature.

The power required from the fuel cell will typically vary during operation. As the required power varies, the heat output of fuel cell stack 22 as well as the reformer's requirements for heated water also varies. Consequently, the portion of oxidizer exhaust 30 required to heat the water 54 to the target temperature, will also vary with the required power. The processor 64 controls the position of valve 28 to supply the heat necessary to heat water 32 to the target temperature as the amount of water provided to the reformer 20 varies. For example, when the power required increases, more heated water 32 is required to provide enough hydrogen-rich steam to support the increased demand. As a result, more oxidation exhaust 30 is required to heat the water 54 to the target temperature. The processor 64 generates the control signal 68 causing the valve 28 to direct more of oxidation exhaust 30 to heat recovery device 26. In that way, fuel cell system 10a uses oxidizer exhaust 30 to supply water 32 heated to the target temperature.

Figure 2:
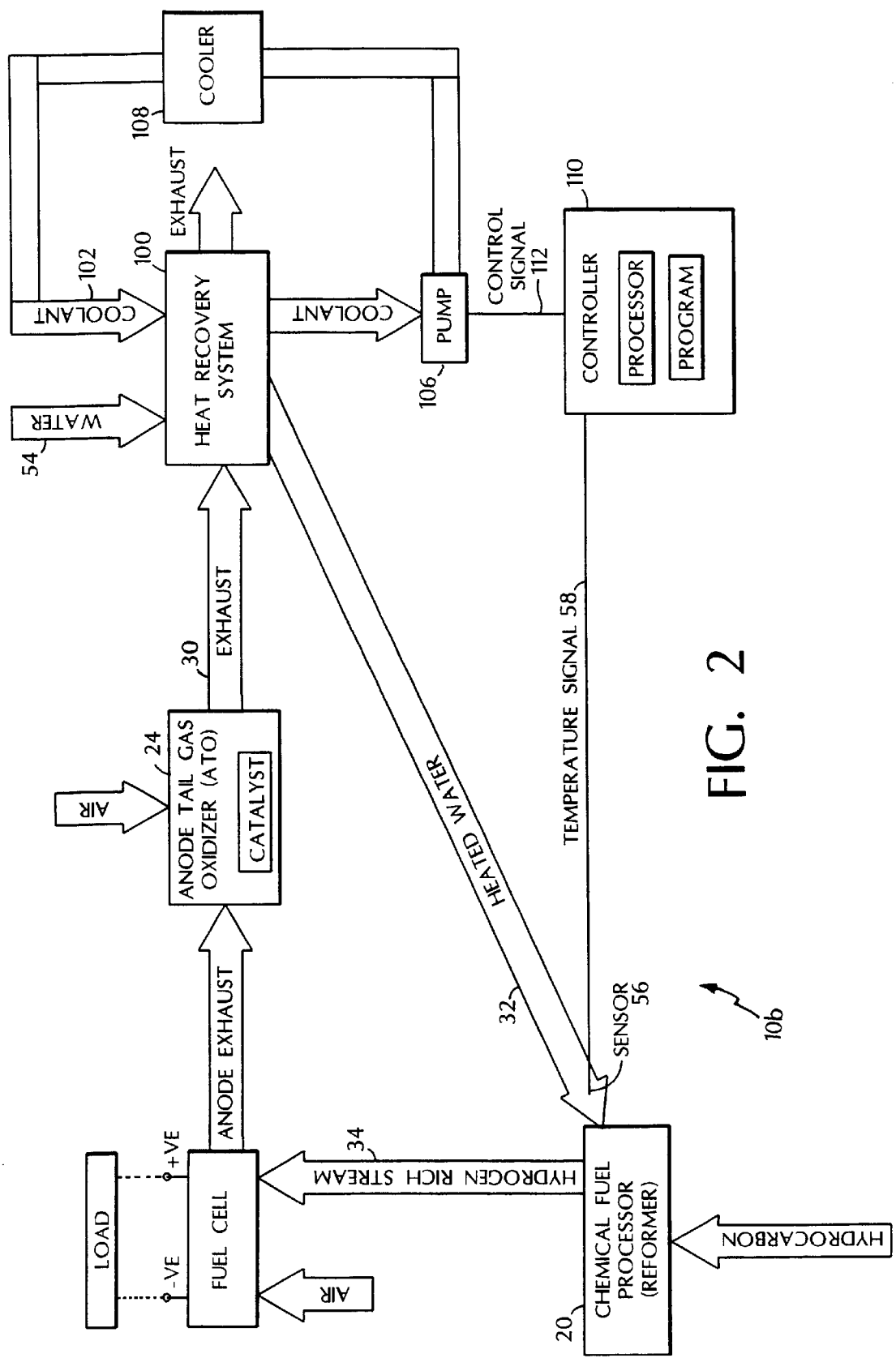
FIG. 2 is a block diagram of an alternative fuel cell system that includes a heat recovery system.

As shown in FIG. 2, another embodiment of the fuel cell system 10b uses different components to recover heat from oxidizer exhaust. Oxidizer exhaust 30 from anode tail gas oxidizer unit 24 flows to a heat recovery system 100, which transfers some of the heat from oxidizer exhaust 30 to water 54 to generate heated water 32 for the reformer 20. Heat recovery system 100 also transfers some of the heat to a coolant 102, to produce a heated coolant 104. Heat recovery system 100 is a two fluid heat exchange system, examples of which are described below with reference to FIGS. 3–5B. As will be described below, the heated water 32 is maintained at the target temperature by transferring excess heat from the oxidizer exhaust 30 to the coolant. In some embodiments, heat recovery system 100 may share a heat transfer surface with ATO 24. For example, a humidifier for humidifying the reformer feed with water 32 may enclose the ATO 24 and the heat recovery system 100, so that the heat recovery process (e.g., the flow of water 54 and/or coolant 102) can be used to regulate the temperature of the catalyst within the ATO.

A pump 106 pumps heated coolant 104 to a cooler 108, which extracts heat from the heated coolant 104 to produce coolant 102 that is again provided to the heat recovery system 100. The cooler 108 is typically a heat exchanger that provides the extracted heat to one or more other components of the fuel cell system 10b. The cooler 108 could also be a radiator for expelling heat from the fuel cell system 10b. The rate at which pump 106 pumps coolant 104 controls the amount of heat extracted from the heat recovery system 100 by the coolant. For example, if the pumping rate is increased, more coolant flows through heat recovery system 100, thereby extracting more heat from the system 100. Thus, by controlling the flow rate in the coolant loop, one can control the temperature of the heated water 32 from the heat recovery system 100.

A controller 110 generates a control signal 112 for controlling the pumping rate of pump 106 based on the temperature signal 58 from temperature sensor 56. The controller 110 maintains the temperature of the heated water 32 at the target temperature by causing the pump and the coolant loop to draw excess heat away from the heat recovery system 100.

Figure 3:
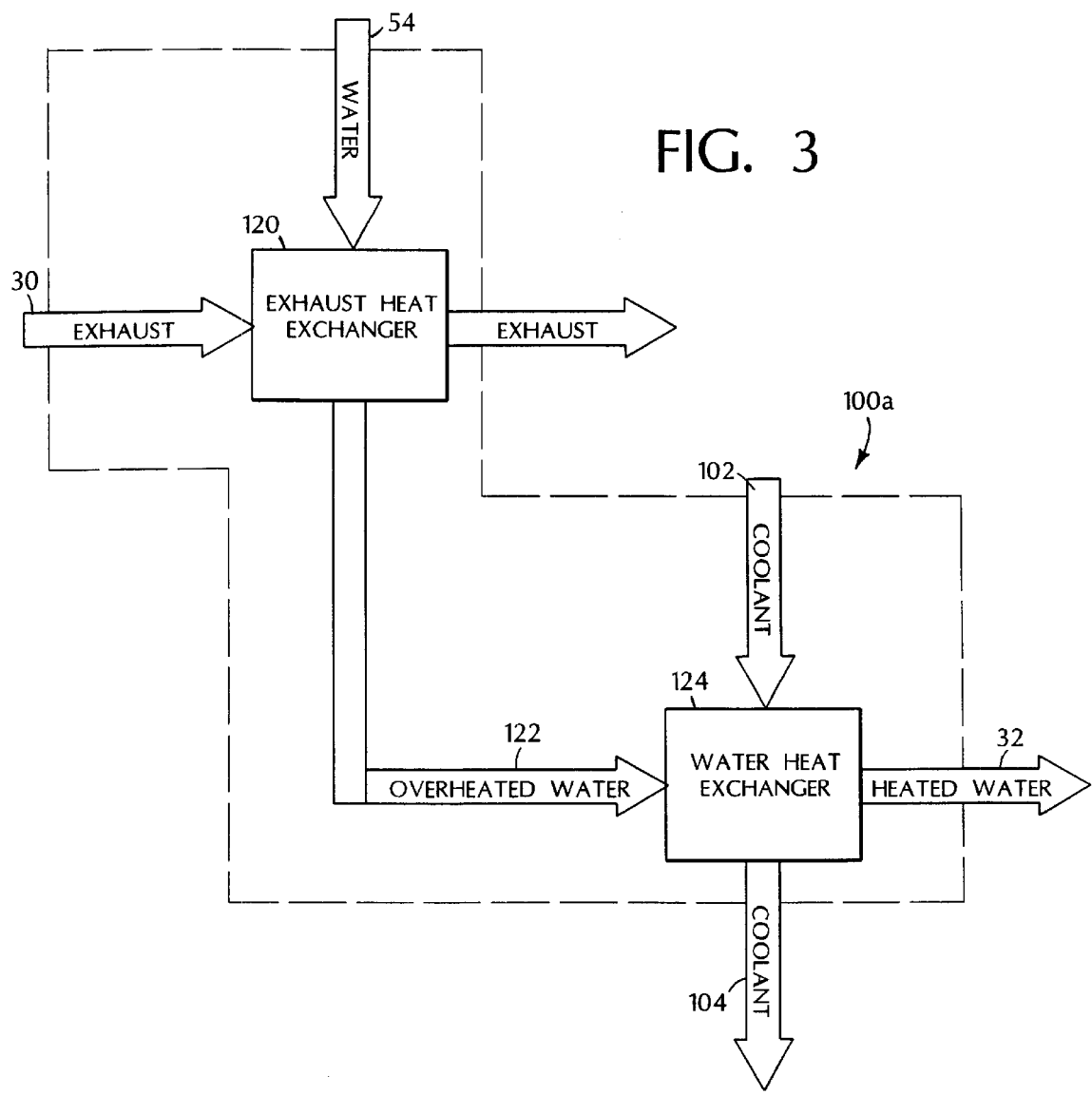
FIG. 3 is a block diagram of a first variation of the heat recovery system of FIG. 2.

FIG. 3 shows an embodiment 100a of heat recovery system 100. It includes an exhaust gas heat exchanger 120, which transfers heat from oxidizer exhaust 30 to water 54 to produce hot water 122. Heat exchanger 120 raises the temperature of water 122 above the target temperature required by the reformer. Heat recovery system 110a also includes a second heat exchanger 124, which transfers heat from hot water 122 to coolant 102 to produce heated water 32 at the target temperature. As previously described, controller 110 causes pump 106 to pump the coolant through heat exchanger 124 at a pumping rate that produces heated water 32 at the target temperature.

Figure 4:
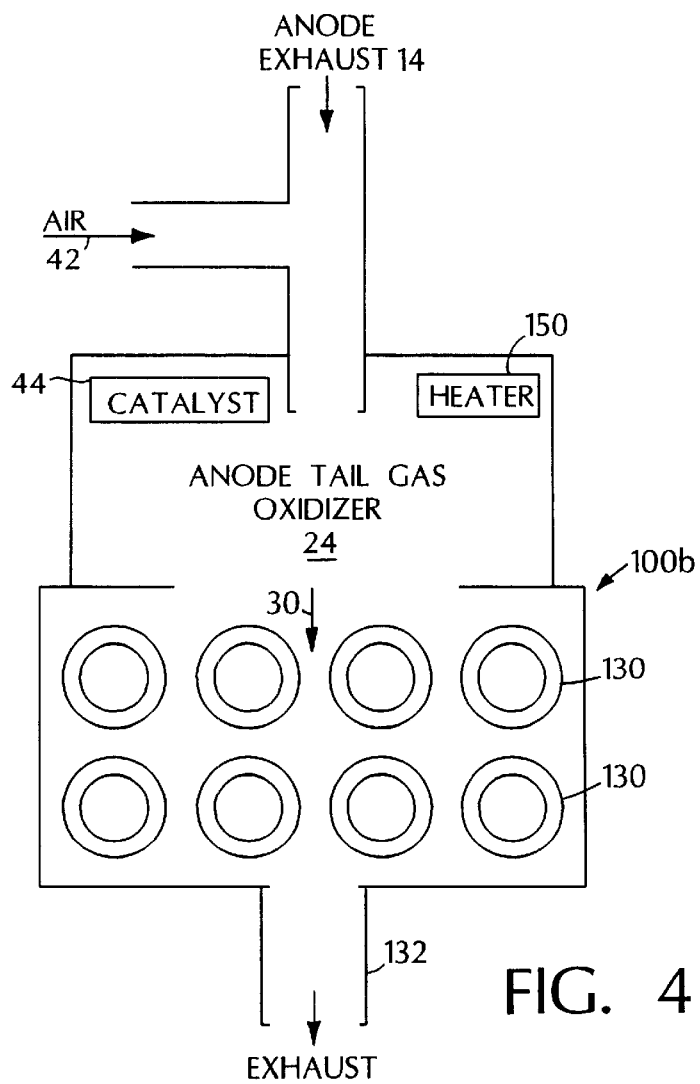
FIG. 4 is a cross-sectional view of a second variation of the heat recovery system of FIG. 2.

FIG. 4 shows another embodiment 100b of the heat recovery system 100. The heat recovery system 100b includes a matrix with many exchange tubes 130 running through it, instead of the heat exchangers 120 and 124 shown in FIG. 3. Each of the exchange tubes 130 carries both water 54 and coolant 102. The heat recovery system 100b is positioned at a downstream end of the anode tail gas oxidizer unit 24 to allow oxidizer exhaust 24 to flow from the oxidizer unit 24 through the heat recovery system 100b and out of an outlet 132. As the oxidizer exhaust 30 flows through the heat recovery system 100b, it contacts exchange tubes 130, which conduct heat from exhaust 30 to water 54 and coolant 102 in the tubes 130. this cools the exhaust 30, while heating both the water 54 and the coolant 102.

Figure 5A:
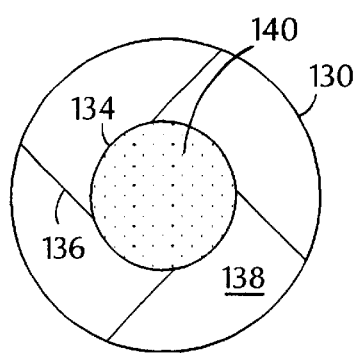
FIG. 5A is a more detailed cross-sectional view of a heat transfer pipe of the heat recovery system of FIG. 4.
Figure 5B:
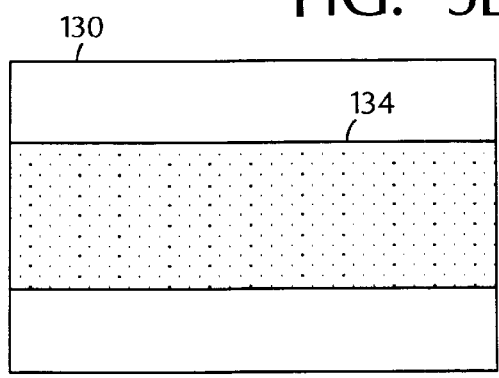
FIG. 5B is a length-wise cross-sectional view of the heat transfer pipe of FIG. 5A.

As shown in FIGS. 5A and 5B, each exchange tube 130 includes an outer tube and a concentrically arranged inner tube 134, which is held at the center of the exchange tube 130 by thermally conductive vanes 136, such as metal vanes. Water 54 flows through an annular region 138, which is defined between the outer tube 130 and the inner tube 134, while coolant 102 flows through the center 140 of the inner tube 134. The exchange tube 130 conducts heat from the oxidizer exhaust 30 to the water 54 and conductive vanes 136 conduct heat from the exhaust 30 to the coolant 102.

Fuel cell system 10 is typically positioned outdoors where it is sometimes exposed to low temperatures that are below the freezing temperature of water. When the fuel cell system 10 is not in use, it is drained of water to avoid damage to the fuel cell system by freezing water. The fuel cell system 10 is not drained of coolant, which is a fluid, such as propylene glycol, that does not freeze at the low temperatures.

Referring again to FIG. 4, at startup on cold days, no water 54 is provided to the heat recovery system 100b until the temperature of the fuel cell system 10 rises above the freezing temperature of water. Since the heat recovery system 100b does not provide water to reformer 20, reformer 20 does not produce the hydrogen rich stream 34. Instead, un-reacted hydrocarbons 36 flow through reformer 20 and fuel cell stack 22 to anode tail gas oxidizer unit 24.

Catalyst 44 does not promote the oxidation reaction at temperatures below a minimum reaction temperature. An electric heater 150, such as a nicrom wire heater, is provided in the anode tail gas oxidizer unit 24 to heat the catalyst 44 to a temperature above the minimum reaction temperature. When hot catalyst 44 reacts the exhaust 15 with air 42, more heat is generated that is in turn transferred to the coolant 102 in the tubes 130 of the heat recovery system 100b. Cooler 108 extracts the heat from the coolant and uses it to heat other components of the fuel cell system 10b. Once the temperature of the components of the fuel cell system 10b are above the freezing point of water, water 54 is allowed to flow through heat recovery system 100b.

In certain embodiments, the order of the water and the coolant is reversed so that the water flows through the center 140 of the inner tube 134 while the coolant 102 flows through the annular channel 138.

A number of embodiments of the invention have been described. Nevertheless, it will be understood that various modifications may be made without departing from the spirit and scope of the invention.

Figure 6:
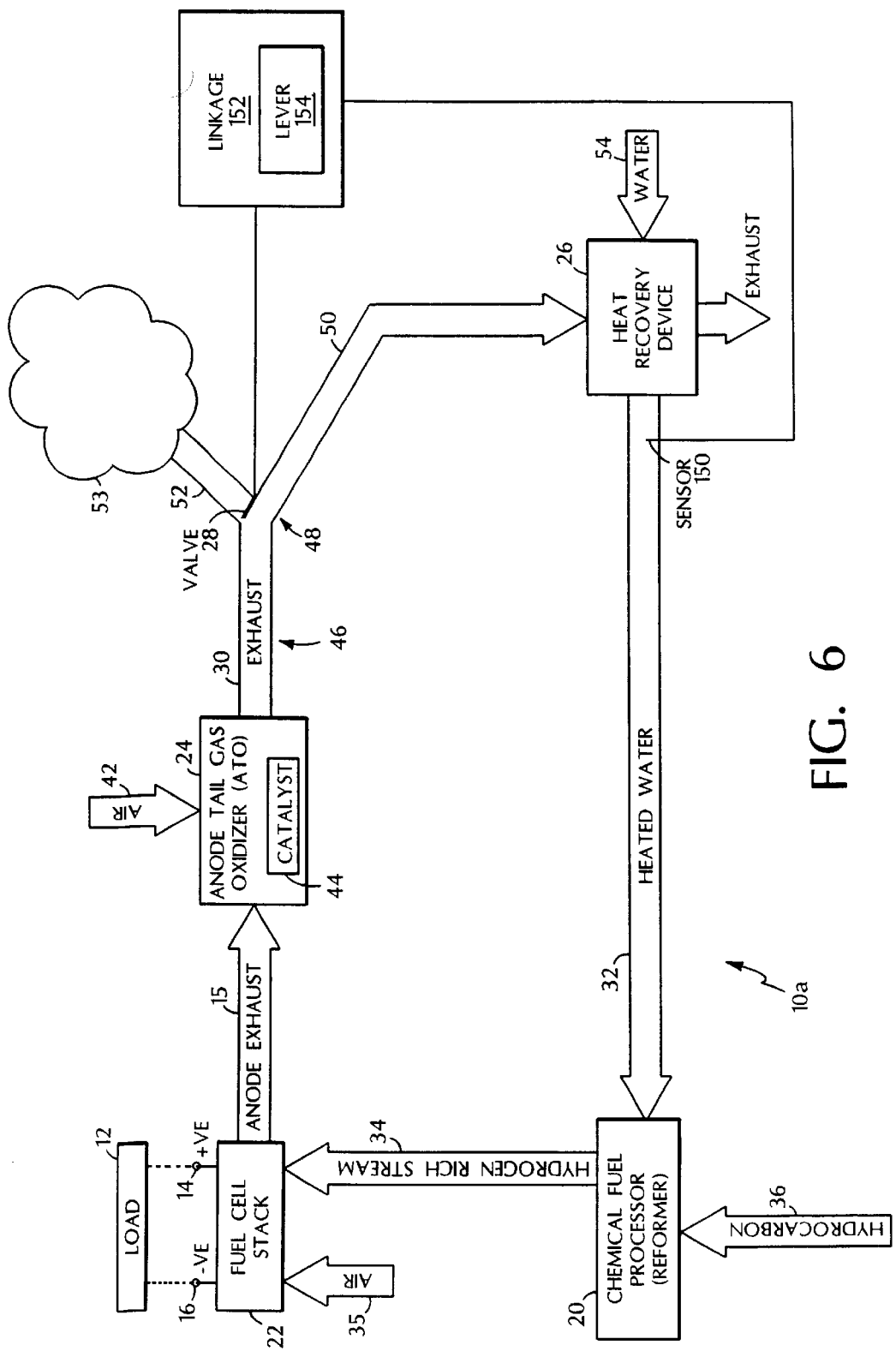
FIG. 6 is a block diagram of an alternative embodiment of the fuel cell system of FIG. 1.

For example, FIG. 6 shows a particularly simple way of implementing the control system described in connection with FIG. 1. As shown in FIG. 6, a mechanical device similar to a thermostat used in a car may be used to control the temperature of heated water 32. In such a mechanical device, the temperature sensor 150 is in the form of a material, such as a wax plug or a bimetal strip, whose size and/or shape varies with temperature. The sensor 150 is positioned in the path of heated water 32 so the size of the sensor 150 varies with the temperature of the heated water 32. A linkage system 152 that includes a lever system 154 couples the temperature sensor 56 to the valve 28 so that the valve deflects as the size and/or shape of the temperature sensor 150 varies. The linkage system 152 and the sensor 150 are designed so that the deflections of the valve 28 maintain the temperature of the heated water 32 at the target temperature. Though we have described a hydrogen/oxygen fuel cell system, the ideas presented here have applicability to other fuel cell systems. In the other fuel cell systems, the recovered heat may be used to heat other fuel cell system inputs besides water.

Other embodiments are within the scope of the following claims.

What is claimed is:
1. A fuel cell system, comprising:
a fuel cell stack which during operation generates electrical energy by reacting a first stream of reactant gas and a second stream of reactant gas, the fuel cell stack also producing a fuel cell exhaust stream;
an oxidizer unit positioned to receive the fuel cell exhaust stream, the oxidizer unit oxidizing at least a part of the fuel cell exhaust stream during operation to produce an oxidizer exhaust stream;

a heat recovery system positioned to receive the oxidizer exhaust stream during operation, the heat recovery system transferring at least some heat from the oxidizer exhaust stream to an input stream to generate a heated input stream;

a control system to maintain the heated input stream at a target temperature by controlling a first amount of the heat from the oxidizer exhaust stream that is transferred to the input stream.

2. The fuel cell system of claim 1, further comprising a temperature sensor positioned to sense the temperature of the heated input stream, wherein the control system maintains the heated input at the target temperature based on the temperature of the heated input stream.

3. The fuel cell system of claim, 1 further comprising:

a cooling system;

wherein, during operation:

the heat recovery system transfers a second amount of the heat from the oxidizer exhaust stream to the cooling system thereby reducing the first amount of heat from the oxidizer exhaust stream that is transferred to the input stream; and the control system controls the second amount of heat from the oxidizer exhaust stream that is transferred to cooling system based on the temperature of the heated input stream to maintain the temperature of the heated the input stream at the target temperature.

4. The fuel cell system of claim 3, wherein the cooling system further comprises:

a coolant which during operation flows through the heat recovery system to extract heat from the heat recovery system;

a cooler, wherein during operation the coolant flows through the cooler and the cooler extracts the heat from the coolant; and a pump which during operation drives the coolant through the heat recovery system and the coolant, thereby causing the coolant to extract the second amount of heat from the oxidizer exhaust stream based on the temperature of the heated input stream.

5. The fuel cell system of claim 4, wherein the control system further comprises:

a controller programmed to generate a control signal based on the temperature of the heated input stream, wherein the pump drives the coolant based on the control signal to maintain the heated input at the target temperature.

6. The fuel cell system of claim 4, wherein the heat recovery system comprises:

a first heat recovery device to transfer heat from the oxidizer exhaust stream to the input stream to produce an hot input stream at a temperature above the target temperature; and a second heat recovery device to transfer heat from the hot input stream to the coolant to produce the heated input stream at the target temperature.

7. The fuel cell system of claim 4, wherein the heat recovery system comprises:

a cavity positioned to receive the oxidizer exhaust stream;

a heat exchange tube positioned in the cavity to extract heat from the oxidizer exhaust stream;

an inner conductive tube positioned within the heat exchange tube to receive a first fluid; and at least one vane connecting the inner conductive tube to the heat exchange tube to concentrically position the inner conductive tube within the heat exchange tube, the vane conducting heat from the exchange tube to the inner conductive tube and the first fluid;

wherein the inner conductive tube and the exchange tube define an annular channel for receiving a second fluid and the heat exchange tube conducts heat from the oxidizer exhaust stream to the second fluid; and at least one of the first fluid and the second fluid is the input stream.

8. The fuel system of claim 7, wherein at least one of the first fluid and the second fluid is the coolant.

9. The fuel cell system of claim 1, further comprising:

a conduit to receive the oxidizer exhaust stream from the oxidizer unit, the conduit having a branch that is connected to the heat recovery system;

wherein the control system includes:

a valve positioned within the conduit to control an amount of the oxidizer exhaust stream that is directed to the heat recovery device through the branch in response to the temperature of the heated input, thereby controlling the amount of heat transferred to the input stream.

10. The fuel cell system of claim 9, wherein the temperature sensor is a thermocouple that generates a sensor signal corresponding to the temperature of the heated input, the control system further including:

a microprocessor programmed to generate a control signal based on the sensor signal; and a motor to deflect the valve in response to the control signal, thereby causing the valve to control the amount of heated exhaust that is directed to the heat recovery device.

11. The fuel cell system of claim 9, wherein the size or shape of the temperature sensor varies with the temperature of the heated input, the control system further comprising:

a linkage connecting the temperature sensor to the valve causing the valve to deflect as the size or shape of the temperature sensor varies, thereby causing the valve to control the amount of heated exhaust that is directed to the heat recovery device.

12. The fuel cell system of claim 11, wherein in the linkage and the temperature sensor are designed to control the amount of heated exhaust that is directed to the heat recovery device to maintain the heated input at the target temperature.

13. The fuel cell system of claim 11, wherein the temperature sensor include an element whose size or shape varies as the temperature of the heated input changes.

14. The fuel cell system of claim 13, wherein the element includes at least one of a bimetal strip and a wax plug.

15. A method comprising:

generating electrical energy by reacting a first stream of reactant gas and a second stream of reactant gas in a fuel cell to produce a fuel cell exhaust stream;

oxidizing at least a part of the fuel cell exhaust stream to produce an oxidizer exhaust stream;

transferring at least some heat from the oxidizer exhaust stream to an input stream to generate a heated input stream;

sensing the temperature of the heated input stream;

maintaining the heated input stream at a target temperature by controlling a first amount of the heat from the oxidizer exhaust stream that is transferred to the input stream based on the temperature of the heated input stream.

16. The method of claim 15, further comprising:

transferring a second amount of the heat from the oxidizer exhaust stream to a cooling system thereby reducing the first amount of heat from the oxidizer exhaust stream that is transferred to the input stream; and controlling the second amount of heat from the oxidizer exhaust stream that is transferred to cooling system based on the temperature of the heated input stream to maintain the temperature of the heated the input stream at the target temperature.

17. The method of claim 16, wherein the step of transferring the second amount of the heat from the oxidizer exhaust further comprises:

extracting heat from the heat recovery device using a coolant; and driving the coolant out of the heat recovery system, thereby causing the coolant to extract the second amount of heat from the oxidizer exhaust stream based on the temperature of the heated input stream.

18. The method of claim 17, further comprising:

generating a control signal based on the temperature of the heated input stream; and driving the coolant out of the heat recovery system based on the generated control signal, thereby causing the coolant to extract the second amount of heat from the oxidizer exhaust stream based on the temperature of the heated input stream.

19. The method of claim 18, further comprising:

transferring heat from the oxidizer exhaust stream to the input stream to produce an hot input stream at a temperature above the target temperature; and transfer heat from the hot input stream to the coolant to produce the heated input stream at the target temperature.

20. The method of claim 15, further comprising:

determining an amount of the oxidizer exhaust stream that is required to heat the input stream to the target temperature;

using only the determined amount of the oxidizer exhaust to heat the input stream, thereby controlling the amount of heat transferred to the input stream to maintain the temperature of the output stream at the target temperature.

21. The method of claim 20, further comprising:

generating a sensor signal corresponding to the sensed temperature of the heated input;

computing a control signal based on the generated sensor signal; and using the control signal to control a device that directs only the determined amount of oxidizer exhaust to a heat recovery system for heating the input stream, thereby maintaining the healed input at the target temperature.

22. The method of claim 15, wherein the input stream is water.

23. The method of claim 15, wherein the heated input stream is a humidified fuel processor fuel inlet stream.

24. A Fuel cell system comprising:

a fuel cell stack which during operation generates electrical energy by reacting a first stream of reactant gas and a second stream of reactant gas, the fuel cell stack also producing a fuel cell exhaust stream;

an oxidizer unit positioned to receive the fuel cell exhaust stream, the oxidizer unit oxidizing at least a part of the fuel cell exhaust stream during operation to produce an oxidizer exhaust stream;

a heat recovery system positioned to receive the oxidizer exhaust stream during operation, the heat recovery system transferring at least some heat from the oxidizer exhaust stream to a water stream;

a fuel processor humidifier system adapted to mix a hydrocarbon gas stream with the water stream to form a humidified fuel processor fuel inlet stream; and a fuel processor system adapted to receive the humidified fuel processor fuel inlet stream.

25. The fuel cell system of claim 24, further comprising:

a temperature sensor adapted to measure a temperature of the fuel processor humidifier system; and a control system adapted to control the heat recovery system based on the temperature of the fuel processor humidifier system.

26. The fuel cell system of claim 24, wherein the oxidizer unit is enclosed within a housing, and said housing forms a structural portion of the humidifier system such that heat transfer is effected between the oxidizer unit and the humidifier system.

27. The fuel cell system of claim 26, wherein the humidifier system encloses a portion of the oxidizer unit.

28. The fuel cell system of claim 27, wherein said humidifier system is adapted to receive a heated water stream such that the heated water stream comes in contact with an evaporation surface.

29. The fuel cell system of claim 28, wherein said humidifier system is adapted to flow a hydrocarbon gas across the evaporation surface to form a humidified fuel processor fuel inlet stream.

30. The fuel cell system of claim 29, wherein the humidifier system further comprises a coolant line adapted to circulate a coolant to transfer heat between the coolant and the humidifier system.

31. A method comprising:

regulating an amount of air fed to an oxidizer unit to maintain a desired temperature of a catalyst within the oxidizer unit;

transferring heat from an exhaust of the oxidizer unit to a water stream to form a heated water stream;

transferring heat from the heated water stream to a coolant stream to maintain a desired temperature of the heated water stream;

flowing a fuel processor gaseous fuel stream across the heated water stream; and controlling a temperature of the heated water stream to regulate an amount of water vapor that is passed into the fuel processor gaseous fuel stream.

32. The method of claim 31, further comprising flowing the heated water stream onto an evaporation surface and flowing the fuel processor gaseous fuel stream over the evaporation surface.

* * * * *